United States Patent [19]

Greenfield

[11] 4,171,937

[45] Oct. 23, 1979

[54] GRILL PANEL AND MOTOR MOUNT ASSEMBLY

[75] Inventor: John B. Greenfield, Fort Smith, Ark.

[73] Assignee: Rheem Manufacturing Company, New York, N.Y.

[21] Appl. No.: 794,562

[22] Filed: May 6, 1977

Related U.S. Application Data

[63] Continuation-in-part of Ser. No. 656,783, Feb. 10, 1976, Pat. No. 4,043,708.

[51] Int. Cl.² .................. F04B 17/00; F16F 15/00; F24F 13/08; H02K 5/24
[52] U.S. Cl. ............................ 417/424; 98/43 R; 98/121 R; 165/122; 248/672; 248/674; 310/51
[58] Field of Search .............. 417/363, 424; 62/507, 62/508; 98/43 R, 43 A, 114, 121 R, 121 A; 165/122; 248/15, 14; 415/121 G; 310/51, 91

[56] References Cited

U.S. PATENT DOCUMENTS

| | | | |
|---|---|---|---|
| 1,713,648 | 5/1929 | Feinberg et al. | 98/121 R |
| 1,853,333 | 4/1932 | Bates | 165/122 |
| 2,598,763 | 6/1952 | De Roo | 98/121 R |
| 2,615,620 | 10/1952 | Goettl | 248/15 |
| 2,843,036 | 7/1958 | Quick | 98/43 R |
| 3,865,517 | 2/1975 | Simmons et al. | 62/507 |
| 4,051,770 | 10/1977 | Felter et al. | 98/43 C |

Primary Examiner—Carlton R. Croyle
Assistant Examiner—Thomas I. Ross
Attorney, Agent, or Firm—Allegretti, Newitt, Witcoff & McAndrews

[57] ABSTRACT

An improved grill panel and motor mount assembly for fans and fan motors includes a plurality of flexible cables connecting the end plates of the motor housing with a mounting bracket attached to a louvered panel. The cables retain the blower motor in proper position while providing sufficient flexibility to damp out vibrations which occur due to the operation of the fan motor. The combination sheet metal air discharge grill and fan motor mount assembly includes sectors of louvers arranged about a center support section of the grill panel.

3 Claims, 9 Drawing Figures

GRILL PANEL AND MOTOR MOUNT ASSEMBLY

CROSS REFERENCE TO A RELATED APPLICATION

This is a continuation in part application to application Ser. No. 656,783 (now U.S. Pat. No. 4,043,708) filed Feb. 10, 1976, which is incorporated herewith by reference.

BACKGROUND OF THE INVENTION

This invention relates to an improved grill panel and motor mount assembly for fans and fan motors.

Residential and commercial forced air, heating and air conditioning systems require air propulsion units. In addition to providing movement of air for the heating or cooling system, air propulsion units are often used in combination with condenser units or to supplement other heat transfer operations. Generally, such units are motor driven fans. These fans may be a blower wheel type or a multi-bladed type.

Heretofore, various means have been utilized to mount the motor which drives the fan. The mounting means generally comprise a sheet metal mounting bracket which is fastened directly to the motor housing. Wire or rod is often used for mounting such motors. Bladed fans are often mounted so as to discharge air vertically upward.

While these prior art structures provide adequate means for mounting a fan motor, vibrations which arise due to operation of the motor may create excessive noise and, in some instances, may result in failure of the mounting bracket. Thus, it is desirable to alleviate vibrations associated with the operation of the fan motor. Additionally, elimination of various parts such as mounting brackets is desirable. Also, improved means for protection of the fan motor from rain and the like is desired.

SUMMARY OF THE INVENTION

In a principal aspect, the present invention comprises an improved discharge grill and motor mount assembly for fan motors of the type having a cylindrical housing with opposed end plates and a drive shaft extending outward from one of the end plates having a bladed fan attachment thereto. The improved motor mount assembly includes a bracket which encircles the motor housing generally perpendicular to the axis of rotation of the output shaft. A plurality of flexible cables connect one or both end plates to the circumferential bracket. The bracket is attached to a horizontal panel with a specially constructed louvered grill, support and shield.

It is thus an object of the invention to provide an improved motor mount assembly for fan motors of the type having a generally cylindrical housing with opposed end plates and a drive shaft projecting from one of the end plates.

It is a further object of the present invention to provide a motor mount assembly which substantially eliminates vibrations due to operation of the motor.

Still another object of the present invention is to provide a motor mounting assembly of simple and economic construction.

One further object of the present invention is to provide a motor mounting assembly which may be utilized in combination with a blade fan and a louvered, horizontal panel.

Another object of the invention is to provide an improved discharge grill which includes a portion to protect a motor from rain.

A further object of the present invention is to provide a discharge grill having a plurality of specially shaped and positioned louvers.

These and other objects, advantages and features of the invention will be set forth in the detailed description which follows.

BRIEF DESCRIPTION OF THE DRAWING

In the detailed description which follows, reference will be made to the drawing comprised of the following figures.

DESCRIPTION OF THE PREFERRED EMBODIMENT

Figure 1:
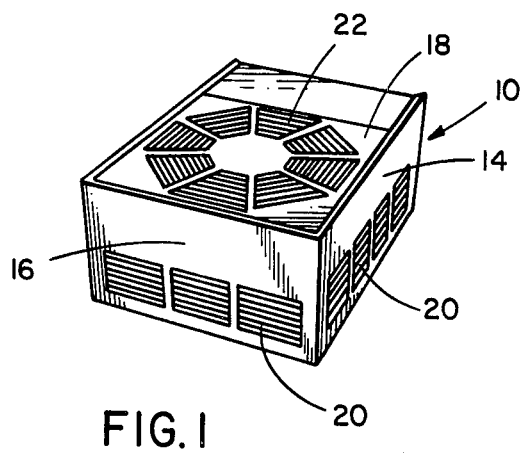
FIG. 1 is a perspective view of a typical air conditioning condenser unit which incorporates a mounted fan assembly and grill panel as claimed.
Figure 2:
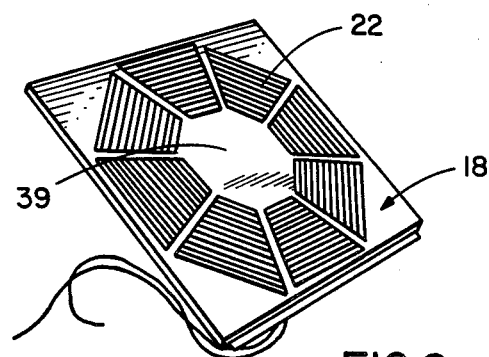
FIG. 2 is a perspective view of the top panel of the unit shown in FIG. 1.

FIG. 1 illustrates a typical condenser unit associated with an air conditioning system. The condenser unit is retained within a housing 10 and includes louvered side panels 14 and 16 and a louvered top panel 18. A fan (19 in FIG. 3) is mounted within the housing 10. Air flow inward through louvers 20 in the side panels 14 and 16 and is exhausted through louvers 22 in the top panel 18. The motive force for driving the fan 19 is a fan motor 30. In the condenser unit illustrated, the fan motor 30 is mounted on the top panel 18.

Figure 3:
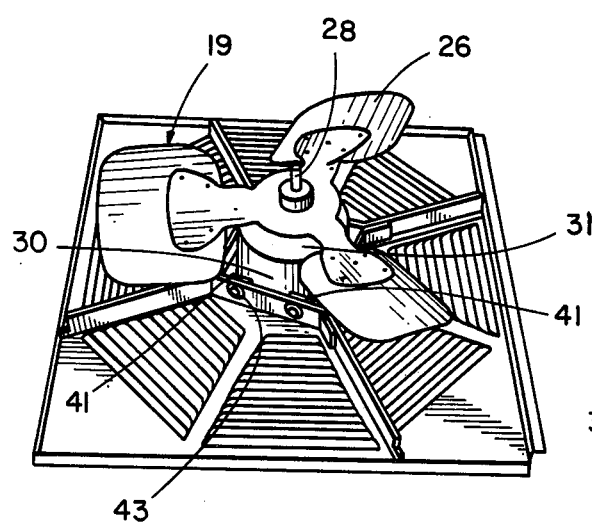
FIG. 3 is a perspective view of the underside of the panel illustrated in FIG. 2.
Figure 7:
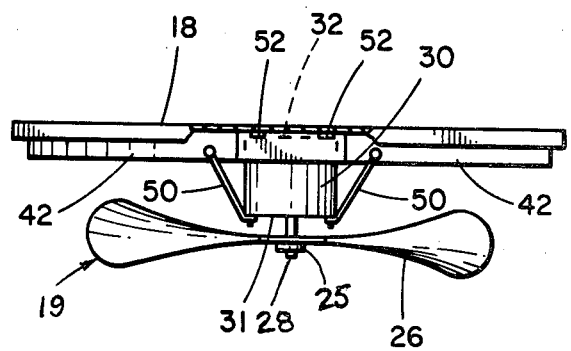
FIG. 7 is a side elevation of the assembly shown in FIG. 3.
Figure 8:
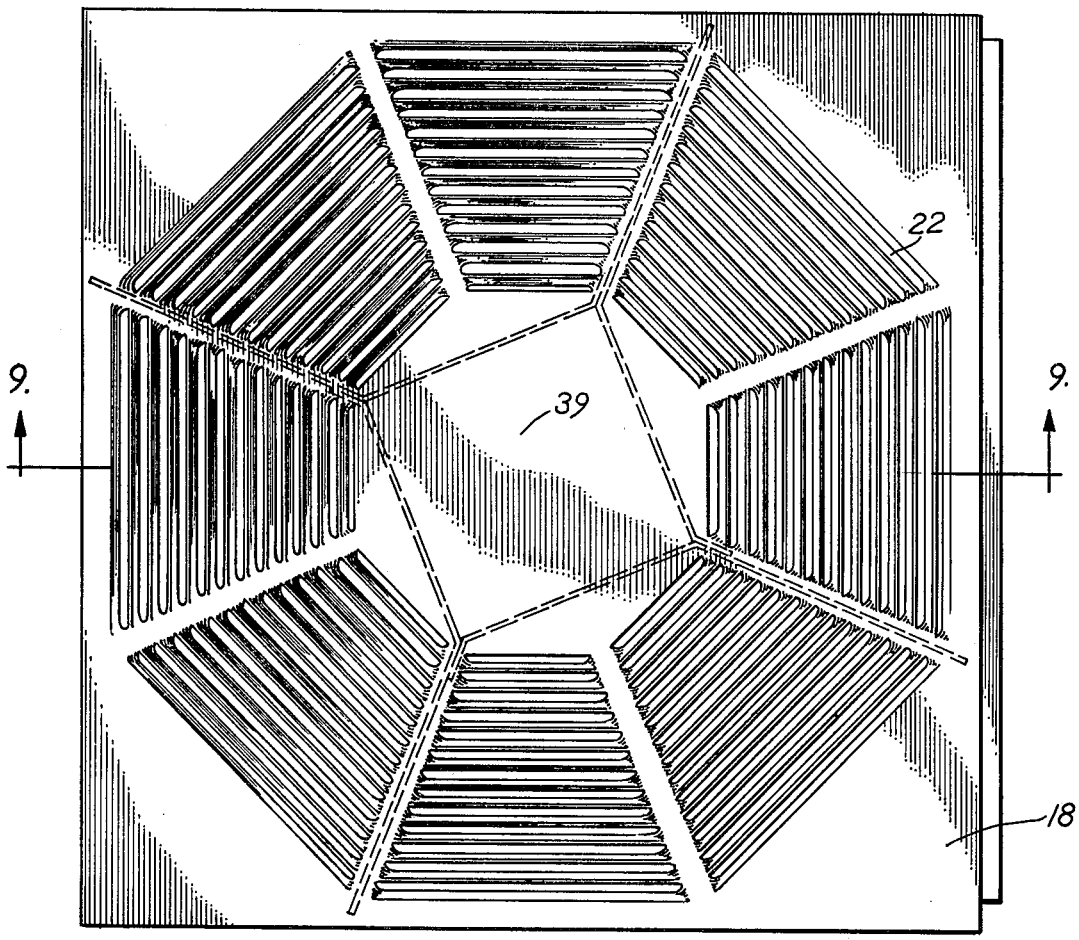
FIG. 8 is another plan view of the grill panel illustrating the grill pattern.

Thus, referring to FIG. 3, a fan 19 with hub 25 and blades 26 is rotated by an output shaft 28 of the fan motor 30. The fan motor 30 has a generally cylindrical housing with opposed end plates 31 and 32 as shown in FIG. 7. The drive shaft 28 projects through end plate 31 for attachment to the hub 25 of fan 19.

Figure 5:
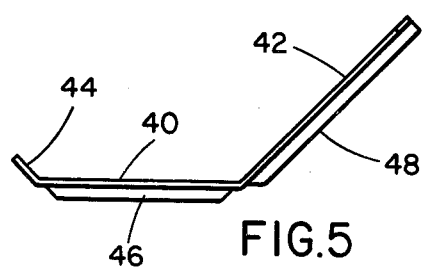
FIG. 5 is a top view of one of the bracket members forming the bracket assembly for the fan motor.
Figure 6:
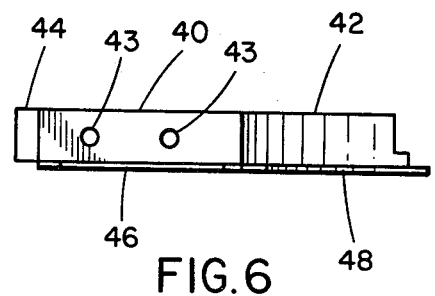
FIG. 6 is a side view of the bracket shown in FIG. 5.

A bracket assembly 33 comprised of four substantially identical bracket member 34-37 is attached to the inside surface of the top panel 18. Each bracket member 34-37 has a similar construction. Referring to FIGS. 5 and 6, a typical bracket member includes a bracket section 40 and a support or bracing section 42. The sections 40 and 42 define an included angle of 135°. The bracket section 40 terminates with a tab section 44. Tab section 44 forms an angle of 135° with bracket section 40. Note that each bracket section 40 and bracing section 42 also include a right angle extension, thereby giving sections 40 and 42 an L shape cross section. These extension are identified as extension 46 and 48, respectively, and assist in the attachment of the final bracket assembly 33 to the top panel 18. That is, extensions 46 and 48 may be welded to the top panel 18.

Figure 4:
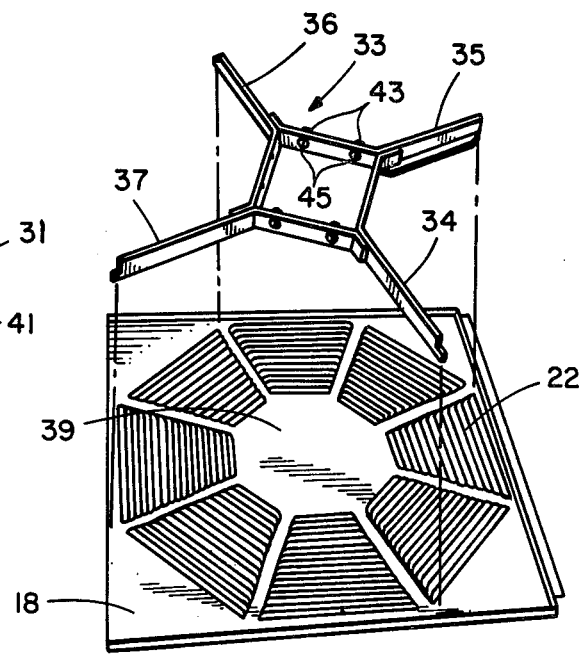
FIG. 4 is a partial exploded view of the panel of FIG. 3 wherein the motor and fan blade have been removed.

The four bracket members 34–37 are fitted together as shown in FIG. 4 to form an encircling bracket for the fan motor 30. The plane of the encircling bracket is generally perpendicular to shaft 28. The bracket assembly 33 formed in this manner is also square in shape and includes bracing sections 42 projecting from each corner of the square outwardly. Sections 42 extend radially outward and attach to panel 18 to provide strength and support to top panel 18.

The bracket sections are attached to the panel 18 at a solid, generally circular center section 39. The axis of the motor 30 defined by shaft 28 generally coincides with the center of center section 39. The louvers 22 are then disposed in a specific pattern about the periphery of the center section 39.

Figure 9:
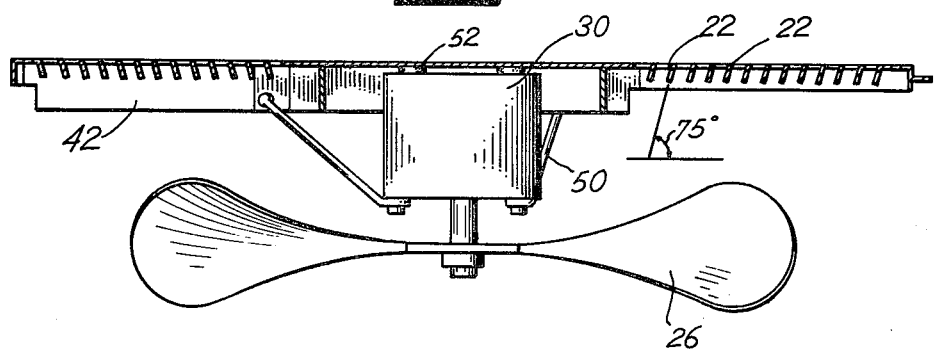
FIG. 9 is a cross-sectional view of the panel of FIG. 8 taken substantially along the line 9—9.

Thus, within the included angle between adjacent projecting bracing sections 42, two sets of louvers 22 are included. The louvers 22 are formed in the sheet metal top panel 18 at an angle of inclination substantially equal to the angle of air flow leaving blades 26 of fan 19. This has been found to be about 75° from the horizontal as shown in FIG. 9. Thus, as air is discharged through the top panel 18, resistance to air movement is reduced to a minimum. Louvers 22 are generally defined or lie on a chord of a circle having its center coincident with the center of center section 39. The louvers are also arranged within designated and slightly spaced sectors of a circle having its center coincident with the center of the center section. Each sector is preferably equiangular. Three or more sectors are preferred though eight sectors provides a highly desirable panel structure as illustrated.

Because of the unique structure of the bracket assembly 33, louvers 22 may be arranged about the entire circumference of the motor 30. Since air flow direction is circular leaving the fan blades 26, maximum air flow is achieved by operation of the motor 30 and fan 19. Note that the region of air associated with the hub 25 and center section 39 of the panel 18 is dead air. Thus, center section 39 may be solid. The louvers, however, extend to define sectors having a radius defined by the limit of radial extension of blades 26. The blades 26 provide a generally annular air flow through the louvers 22. This results in a louver pattern as shown, i.e., a generally annular pattern surrounding the motor 30. The total area defined by the louvers is also dependent upon the free air flow imparted by the fan. The free area defined by the louvers is equal to or greater than the required free air flow.

Also, the center section 39 of the top panel 18 surrounded by louver 22 in combination with bracket assembly provides a rain shield over and around the motor 30 and motor end plate 32. Thus, motor 30 and motor end plate 32 may be provided with ventilation openings for cooling motor 30 and rain will not enter the openings.

After the bracket assembly 33 is attached to the top panel 18, the fan motor 30 is placed in position. This may be accomplished by either of two methods. Both methods are illustrated in combination in the figures though they may separately support a motor 30.

In the first motor mounting method for panel 18, FIG. 7, flexible cable 50 connects from each bracing section 42 to the front end plate 32 of motor 30. The cables 50 are of substantially equal length and retain the motor 30 against the panel 18. Preferably, a resilient material 52 is inserted between the panel 18 and motor end wall 34 to further dampen sound and vibration. The cable 50 is typically a high strength flexible steel cable such as the type used for control of airplane control surfaces.

The second motor mount method for panel 18, FIG. 3, includes braces 41 which extend from motor 30 and are bolted through grommeted openings 43 to the bracket section 40 of assembly 42. Grommets 45 dampen vibration of motor 30.

The embodiment utilizing the top panel 18 as a mounting bracket has the additional advantage of eliminating separate mounting brackets. The top panel has a universal function of bracket, louvered grill, and rain shield. Attachment of the motor is by flexible cable or direct bolt. Thus, while there has been set forth a preferred embodiment, it is to be understood that the invention shall be limited only by the following claims and their equivalents.

I claim:

1. An improved grill panel and motor mount assembly for a fan of the type including a plurality of blades projecting radially from a vertical center support and spin axis and operable to define a generally circular center section of dead air in the region of the center support and an annular region of moving air about the center section, said assembly comprising in combination:

a horizontal, planar sheet metal panel having a pattern of integral, downwardly extending louvers defined in the panel, said panel including a solid, generally circular and multi-sided center section, a plurality of louvers surrounding the center section, said louvers each being die cut and shaped from the panel, said louvers lying within sectors of a circle having the same center coincident with the center of the circle defining the chords, the length of said louvers increasing in proportion to the distance of said louvers from said centers, the number of sides of said multi-sided center section equalling the number of said sectors, said panel further including solid, generally rectangular and radially extending intermediate sections, said intermediate sections intermediate adjacent sectors of said louvers, the number of said intermediate sections equalling the number of said sectors; and each of said louvers being inclined from the plane of the panel and outwardly inclined from the bottom of the louver toward the top thereof; the number of louvers defining free area through the grill panel approximately equal to the rated air flow of the associated fan;

a motor bracket and panel bracing assembly including substantially identical bracket members;

each said bracket member including a bracket section, a bracing section and a tab section;

said bracket section forming a first angle with said bracing section and said tab section forming a second angle with said bracing section;

said bracket section including a right angle extension and said bracing section including a right angle extension, said bracket section and said bracing section thereby having an L shape cross section;

said bracket section projecting radially along the underside of one of said intermediate sections from said center section to said periphery with the extension thereof substantially parallel to said planar panel and attached to said underside of said intermediate section;

said bracing section extending along the underside of the center section of said panel toward the bracket section of an adjacent bracket member with the extension thereof substantially parallel to said planar panel and attached to said underside;

said tab section extending substantially parallel to the bracket section of said adjacent bracket member and attached thereto;

said bracket members thereby forming a unified encircling bracket for mounting of the fan motor and said bracket members and said panel thereby forming a unified assembly providing relative light weight, high strength and substantial rigidity.

2. The improved assembly of claim 1 further including motor means supported in part by the bracket and bracing means at the center section of the panel.

3. The improved assembly of claim 2 including a layer of resilient insulating material between the motor and the panel for resiliently supporting the motor means.

* * * * *